(12) United States Patent
Paulson et al.

(10) Patent No.: US 6,554,044 B2
(45) Date of Patent: Apr. 29, 2003

(54) LAMINATOR PEEL-OFF BAR

(75) Inventors: Bradley A. Paulson, Northfield, MN (US); Brent D. Lien, Minneapolis, MN (US); Ted M. Hoffman, Eden Prairie, MN (US)

(73) Assignee: Fargo Electronics Inc., Eden Prairie, MN (US)

( * ) Notice: Subject to any disclaimer, the term of this patent is extended or adjusted under 35 U.S.C. 154(b) by 0 days.

(21) Appl. No.: 09/770,776

(22) Filed: Jan. 26, 2001

(65) Prior Publication Data

US 2001/0026720 A1 Oct. 4, 2001

Related U.S. Application Data

(60) Provisional application No. 60/178,855, filed on Jan. 28, 2000.

(51) Int. Cl.[7] ............... B44C 1/17; B32B 31/20; B65C 3/00; B65C 9/18; B65H 18/00
(52) U.S. Cl. ............. 156/540; 156/582; 156/344; 156/DIG. 1; 156/DIG. 33; 156/542; 156/555; 427/148; 428/42.3; 428/202; 428/914
(58) Field of Search ................ 156/540, 541, 156/542, 543, 553, 582, 583.1, DIG. 1, DIG. 33, 341, 230, 234, 235, 237, 238, 239, 240, 241, 247, 277, 289; 427/146, 147, 148; 428/42.1, 195, 204, 207, 202, 914, 915, 42.2, 42.3

(56) References Cited

U.S. PATENT DOCUMENTS 4,287,285 A      9/1981  Mosehauer ............. 430/124
4,923,848 A  *  5/1990  Akada et al. ............ 503/227
4,992,129 A  *  2/1991  Sasaki et al. ............ 156/240
5,277,501 A      1/1994  Tanaka et al. .......... 400/120
5,314,133 A  *  5/1994  Sandner et al. ........ 242/67.3 R
5,489,567 A  *  2/1996  Koshizuka et al. ...... 503/227
5,512,126 A  *  4/1996  Kannabiran et al. ..... 156/380.9
5,785,795 A  *  7/1998  Ryan et al. ............. 156/344
5,807,461 A      9/1998  Hagstrom ............... 156/361
6,095,220 A  *  8/2000  Kobayashi et al. ...... 156/540
6,261,012 B1 *  7/2001  Haas et al. ............. 400/208
6,296,032 B1 * 10/2001  Louie et al. ............ 156/387
6,312,174 B1 * 11/2001  Drynkin et al. ........ 400/120.16

FOREIGN PATENT DOCUMENTS

GB          2289443 A   * 11/1995  ............ B41J/2/325

* cited by examiner

Primary Examiner—J. A. Lorengo
(74) Attorney, Agent, or Firm—Westman, Champlin & Kelly PA

(57) ABSTRACT

A reverse image printer that has a backing web carrying a laminate layer upon which a reverse image is printed. The laminate layer is laminated onto a card. The backing web carrying the transfer layer is separated from the laminate layer after the laminate layer and card have been laminated together using a peel-off assembly that guides the backing web at a selected desired separation angle relative to the plane of movement of the card and the laminate layer after lamination. The peel-off assembly uses two guide members to maintain the desired separation angle regardless of changes in diameter of a take-up roller used for the backing web.

7 Claims, 2 Drawing Sheets

LAMINATOR PEEL-OFF BAR

This application claims priority on provisional application Ser. No. 60/178,855, filed on Jan. 28, 2000 for LAMINATOR PEEL-OFF BAR.

BACKGROUND OF THE INVENTION

The present invention relates to a lamination layer peel bar for a reverse image printer that will provide reliable removal of a printed laminated layer of material from a backing web or film after the printed layer has been laminated onto a substrate, such as an identification card.

U.S. Pat. No. 5,277,501 illustrates a method of transferring hot melt ink to a recording medium. The present invention provides for a positive removal of the printed layer, called a printed transfer layer or other laminate, from the backing film after the printed layer has been laminated onto a substrate, specifically an identification card. In the prior art, the problems of having "flash" or flakes of the printed transfer layer come loose or separate from the web and the card are present. In other words, there would not be a smooth and positive peel off of all of the printed transfer layer that should be transferred from the web or film to the card. Flakes tend to come loose, particularly along the edges and sides of the card.

In the prior art, as shown in FIG. 1, a metal guide frame has been used with a rounded nose or edge for guiding the web after lamination of the printed transfer layer to the card and aiding in separating the printed transfer layer from the backing web. The lamination process uses hot rollers that melt a layer of wax or adhesive engaging a surface of the card to cause the transfer layer to adhere to the card surface. The angle of the web carrying the printed layer as the web is peeled away from the printed layer is shallow and also changes as a take up roll for the web that is used gets larger. Because the peel off angle is not optimized, the problems with flakes or flash from the printed lamination material remain.

SUMMARY OF THE INVENTION

The present invention relates to a printer and laminator, wherein a film or web carries a transfer or laminate layer or segments that may be printed with a reverse image and then the transfer layer is laminated to a substrate, such as an identification card. The transfer layer may be a transparent layer of material on which images are printed using a printhead and separate ribbon, or the layer can be an ink layer on which images are created, and which is on a transparent sheet. The arrangement also can be used if segments of a laminate material are carried on a backing film, laminated to a card and then peeled from the backing film.

A peel off bar arrangement is provided for insuring reliable removal of the transfer or laminate layer from the backing web or film that carries the transfer or laminate layer after the transfer layer has been through the lamination station and adhering to the card.

In an intermediate transfer printing process, a web carrying a transparent transfer layer is passed through a printer where a reverse image is printed. The transfer layer is then laminated to an aligned identification card usually using a pair of heated lamination rollers. The laminate or transfer layer is pressed against the card and is heated to cause the printed transfer layer to adhere to the surface of the card. The transfer or laminate layer has to then be separated or peeled from the backing film or web that carries it, while the transfer layer remains in a layer on the card. The backing web, the transfer layer and the card are moved in unison from the heated lamination rollers and across a separation or peel-off bar as the backing web is directed toward a web take-up roller at an angle relative to the plane of movement of the card, which is also the plane of the card. A second guide, such as a bar or roller, guides the backing web, after removal of the transfer layer, so as it leaves the peel-off bar it moves in a path about 90° to the plane of the card as the backing web moves to the web take-up roll. The card and the transfer or laminate layer or material now laminated to the card, continues on its path. The backing web makes an abrupt change of direction so the adhesive type material resisting separation of the backing web and transfer or laminate layer is almost entirely in tension and the tendency of the backing web and the transfer or laminate layer to stick together is reduced. The problems with flaking, particularly along the transfer layer and card edges are reduced.

DETAILED DESCRIPTION OF THE ILLUSTRATIVE EMBODIMENTS

Figure 1:
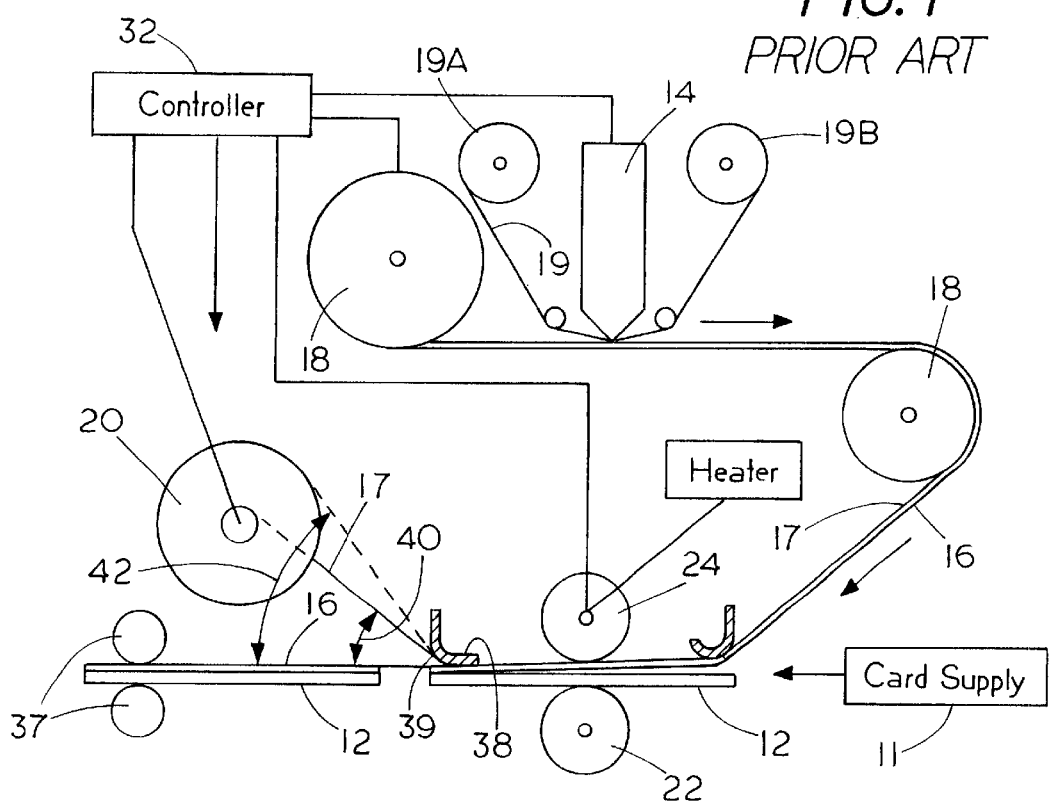
FIG. 1 is a schematic representation of a prior art printing and lamination station utilizing a single peel-off bar.

FIG. 1 schematically shows a prior art printing system 10. The process is a reverse image printing process described in U.S. patent application Ser. No. 09/310,377, filed May 10, 1999, and entitled REVERSE IMAGE PRINTER. In simplified form, card 12 is to have a printed image laminated thereon, and is provided from a card supply 11. A print station 14 prints a reverse image on a heat transferable layer that will be laminated to a card 12. The printing can be directly on a laminate or transfer layer 16, or a ribbon 19, such as a thermal resin or a thermal dye sublimation ribbon, can be passed under the print station 14 and used to print on laminate or transfer layer 16, which is carried on a film or web 17.

The ribbon 19 extends between a supply roller 19A and a take-up roller 19B and is controlled in a known manner. The backing film or web 17 and laminate material layer or intermediate transfer layer 16 are moved from a supply roller 18 and the backing web is transferred to a take-up roller 20 after the laminate or transfer layer has been laminated on the card and separated from the backing web. The transfer layer 16, the web 17, and an identification card 12 are passed between lamination rollers 22 and 24. The roller 24 has a heater 25 therein, which is shown schematically, and the roller is capable of being moved downward to press the laminate material or transfer layer 16 against the card 12. The roller 24 will heat the laminate or transfer layer, and cause the side of the layer 16 facing the card 12 to be activated. This will cause the laminate or transfer layer 16 to adhere to the top surface of the card 12, but the layer 16 also remains with the backing web 17 at this stage since the backing web, layer 16 and the card are moving together. The controller 32 is operably coupled to the supply and take-up rollers 19A and 19B, and to rollers 18 and 20, as well as to the lamination rollers 22 and 24 and to the print station 14, so that it can control printing and lamination.

In order to separate the backing film or web 17 from the laminate material or transfer layer 16 carried on the film or web 17, a peel-off bar 38 is provided in the prior art device. The card 12 and the now laminated layer 16 continue on through feed rollers 37. The web 17 is pulled away from the layer 16 at the rounded corner 39 of the peel-off bar 38 at a shallow angle.

The plane of movement of the backing web 17, as it moves to the take-up roller 20 changes as well. A new take-up roller, which has little of the web wound on it has a small diameter, and a full take-up roller comes to the full diameter of the roll. The angle, which is indicated at 40 by the double arrow in FIG. 1 for the new take-up roller is more shallow than the angle for the plane of movement of the backing web 17 as the take-up roller 20 fills, as indicated by the double arrow 42. The path when the take-up roller 20 becomes filled is indicated by dotted lines.

This release angle indicates that the layer of material holding the intermediate laminate of transfer layer 16 onto the backing web 17 is subjected to shear, and thus the layers resist separation to a greater degree than if the material holding the layers 16 and 17 together is subjected to pure tension as the layers separate.

The material between the backing web 17 and the transfer or laminate layer 16 that holds the backing web 17 and the layer 16 together can be a wax material, that will separate under load. This variation in the angle of separation of the backing web and the intermediate transfer or laminate layer 16 thus also varies the efficiency of the peel-off of the laminate layer 16 from the backing web 17.

Figure 2:
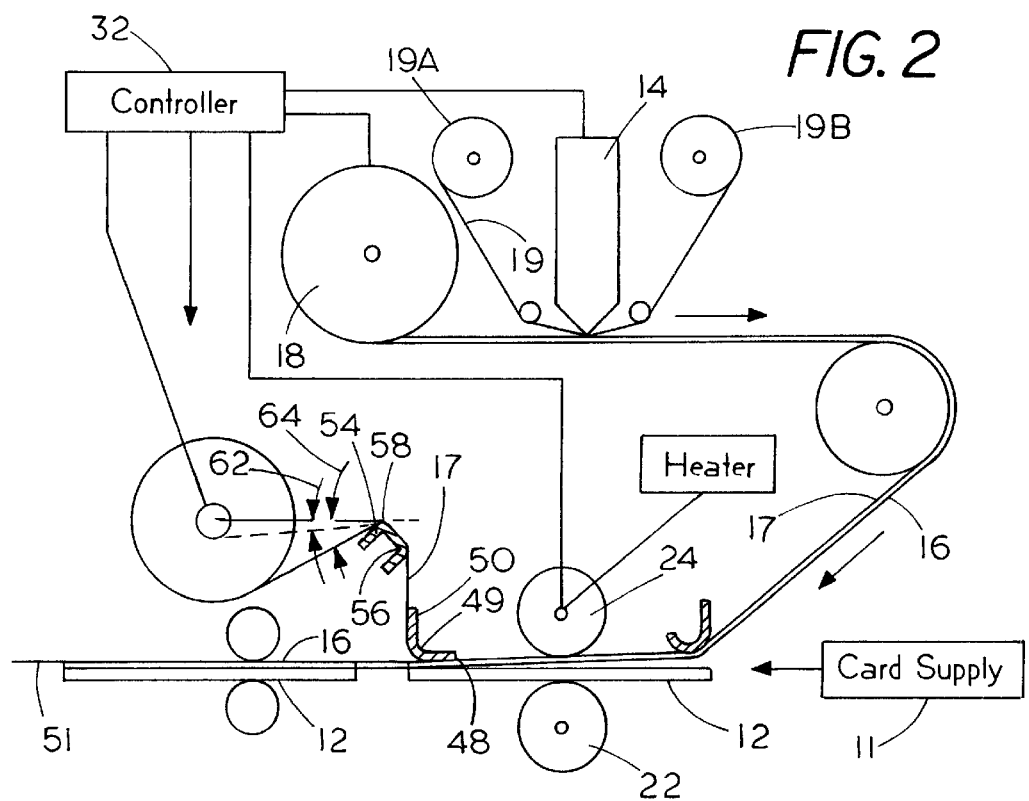
FIG. 2 is a schematic representation similar to FIG. 1 and having a peel-off bar and guide made according to the present invention.

The present invention, as illustrated in FIG. 2, provides a second guide bar or roller for backing web 17 on the output side of the known peel-off bar 38 that is oriented so that the separation angle between the backing web 17 and the laminate layer 16 as the card and laminate layer continue in their path of movement, is substantially 90°, and remains at 90° during the entire time that the take-up roller is being filled with used (empty) backing web material. In FIG. 2 the printer, controller, and guides leading to the laminating rollers 22 and 24 are the same as in FIG. 1, and a card 12 is supplied from a card supply as previously described. However, the peel-off bar 38 is now shown at 48, and it has a rounded corner 49 and an upright leg 50 that is substantially perpendicular to the plane indicated at 51 of the movement of the card and the laminate layer 16 after lamination. The web 17, however, is now guided with a guidebar (or guide roller) 54 that is mounted onto side plates 55 of the printer, and which has a pair of rounded corners shown at 56 and 58, to guide the backing web 17 in a known path generally perpendicular to the plane 51 of travel of laminate layer 16 after it is left the lamination station with the card 12.

As shown by the double arrows 62 and 64, the change in angle of the backing web after it leaves the guide 54 does not affect the separation angle at the rounded corner 49 of the peel-off bar 48. This separation angle remains substantially the same during operation, and can be close to or substantially 90° or greater, to aid in separating the laminate layer 16 from the backing web that carries the laminate layer.

Figure 3:
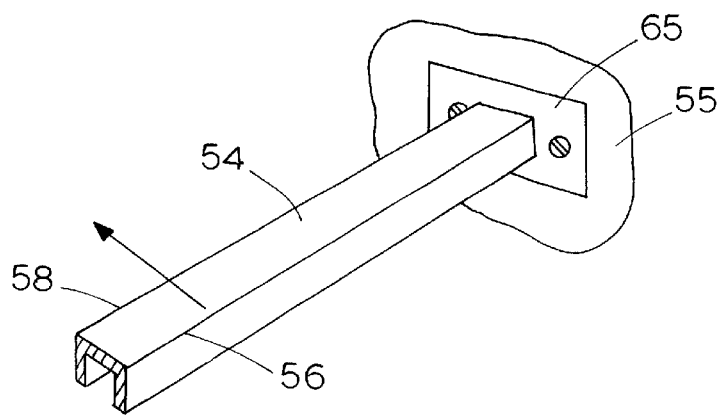
FIG. 3 is a perspective view of a peel-off guide made according to the present invention.

The guide 54 is shown in perspective view in FIG. 3, and it has an end plate 65 for attachment to the printer sidewall 55, and extends across the printer frame so that the length of the guide 54 is greater than the width of the backing web 17. The corners 56 and 58 are rounded as desired to permit the web to slide easily over the guide bar.

Figure 4:
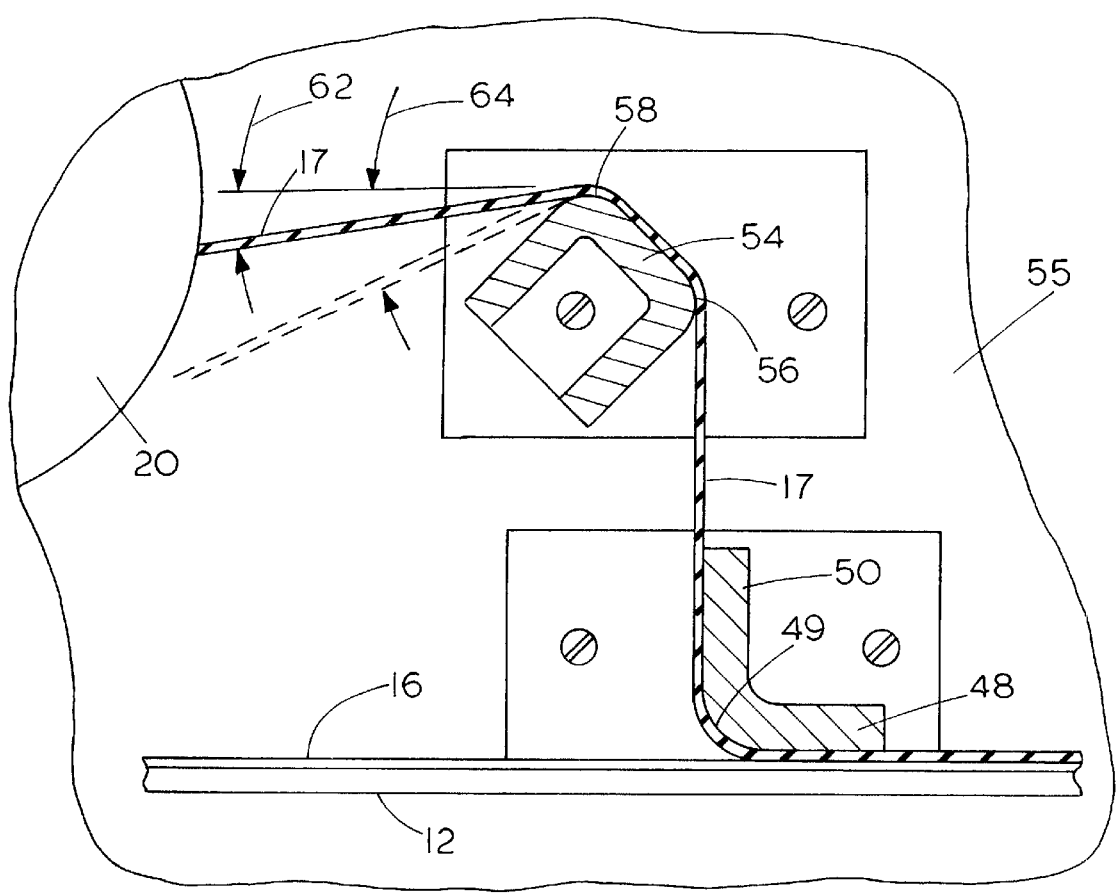
FIG. 4 is an enlarged sectional view of the peel-off bar and guide made according to the present invention.

The guide 54 also can be a rotating roller that is mounted between the side plates of the printer in the usual manner. FIG. 4 is an enlarged cross sectional view of the peel-off bar and guide, to show in greater detail the positioning of the backing web 17, the laminate layer 16 and the card 12 as they separate from the backing web 17 at the peel-off bar 48.

By having a peel-off guide assembly that moves the web through a constant, known peel-off angle, the peel-off angle can be selected to be optimized. As stated, a range between 80° and 100° (10° on either side of a 90° angle) has been found to be satisfactory, and is preferred. The angle is relative to the plane of the card and laminate layer 16, which is the plane of movement of the substrate, shown in FIG. 2.

It should be noted that the peel-off bar 38 also can be a roller if desired, and will be termed a guide for the backing web. Again, it can be a rotating roller of selected diameter.

The term laminate layer or transfer layer does not mean that the layer is necessarily co-extensive with the backing web. Chips or segments of laminate material at spaced intervals along the backing web can be used. The laminate layer can be severed in lengths to fit the card after lamination as well.

Although the present invention has been described with reference to preferred embodiments, workers skilled in the art will recognize that changes may be made in form and detail without departing from the spirit and scope of the invention.

What is claimed is:

1. A peel-off assembly for separating a laminate material layer from a backing web after passing through a lamination station where the laminate material is caused to be laminated onto a substrate moving along a support plane of movement, said peel-off assembly includes a first guide fixedly positioned to guide a backing web carrying laminate material subsequent to lamination of the laminate material to a substrate, a second guide fixedly position between the first guide and a take-up for the backing web and positioned so that the backing web is forced to separate from the laminate material laminated to the substrate at a fixed separation angle relative to the support plane of movement of between 80° and 100° as the backing web moves from the first guide to the second guide.

2. The peel-off assembly of claim 1, wherein the first guide is a fixed bar having a rounded surface directly engaging the backing web.

3. The peel-off assembly of claim 2, wherein said second guide is a fixed bar of a plastic material having a rounded surface directly engaging the backing web.

4. The peel-off assembly of claim 1, wherein the take-up for the backing web comprises a take-up roller.

5. The peel-off assembly of claim 1, wherein the laminate layer comprises a layer carrying printed material and the substrate comprises an identification card.

6. The peel-off assembly of claim 1, wherein the second guide has a cross section with a rounded surface engaging the backing web.

7. The peel-off assembly of claim 1, wherein the first guide has a rounded surface positioned so a portion of the rounded surface engages the backing web while the laminate material is engaged with the substrate, the rounded surface guiding the backing web away from the laminate material to the second guide.

* * * * *